May 24, 1966    M. M. KENSRUE    3,253,116
WELDING APPARATUS AND COMPONENTS THEREOF
Filed Dec. 26, 1963    2 Sheets-Sheet 1

INVENTOR.
MILO M. KENSRUE
BY
ATTORNEY

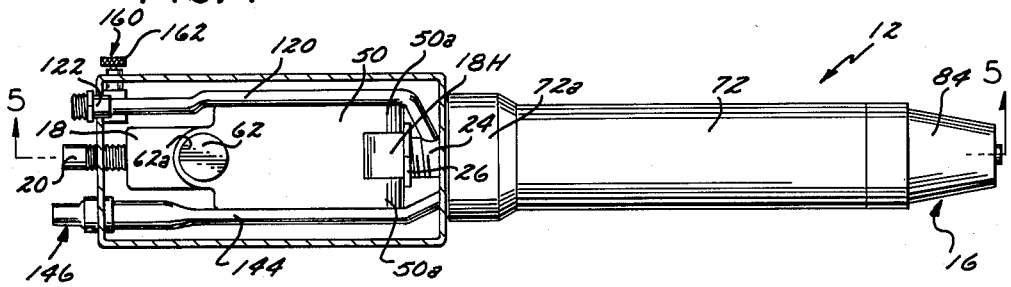
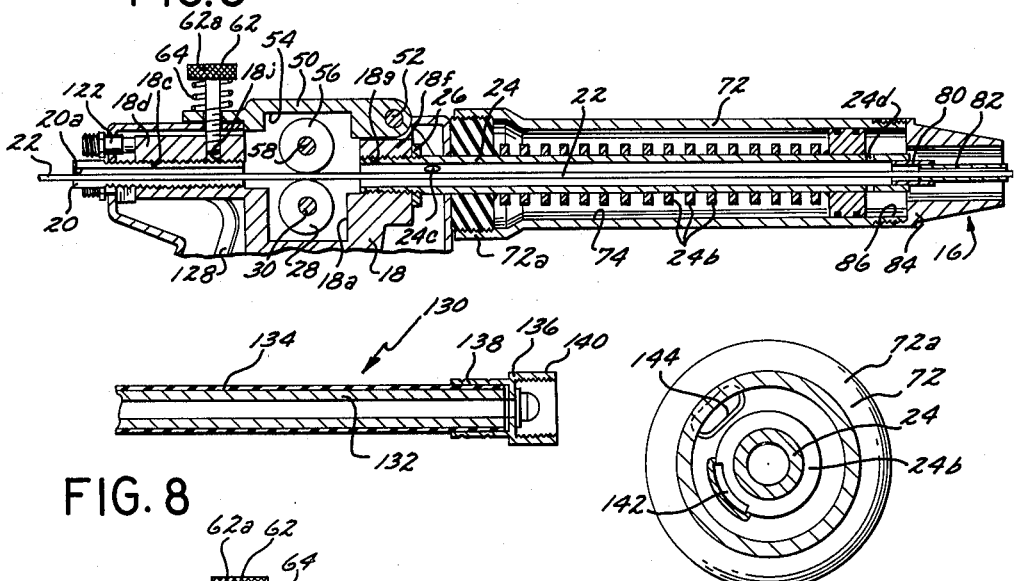
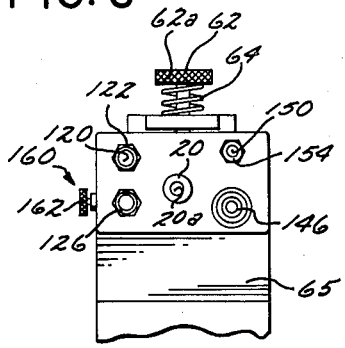
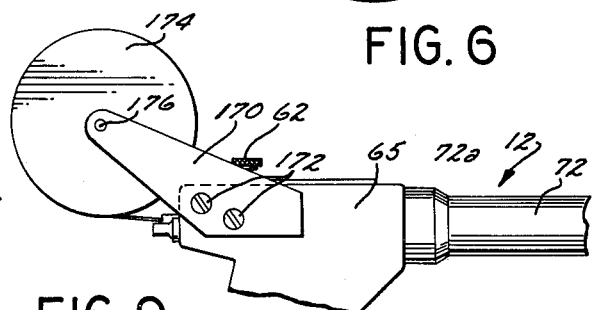

United States Patent Office 3,253,116
Patented May 24, 1966

3,253,116
WELDING APPARATUS AND COMPONENTS THEREOF
Milo M. Kensrue, 13882 Sanderstead, Santa Ana, Calif.
Filed Dec. 26, 1963, Ser. No. 333,529
7 Claims. (Cl. 219—130)

The present invention relates generally to welding apparatus and components thereof, and more particularly to equipment of the type for performing arc welding operations.

Electric arc welding has formed an important part of the welding industry for many years. Basically, this type of welding employs a consumable electrode which is provided with an electrical potential different from the potential of the work piece to be welded. By placing the charged electrode in close proximity to the work piece, an electric arc is established therebetween, which arc generates a considerable amount of heat energy for melting the electrode and the work piece in a relatively small localized area. The welding material from the electrode fuses with the molten portion of the work piece to provide an extremely strong and rugged bond.

Devices and apparatus for performing the above functions have heretofore been widely used in virtually all metal fabricating industries. However, most of them have been objectionable for various different reasons. For instance, many arc welding apparatuses in use today are constructed such that the operator cannot perform the welding operations a reasonable distance from the source of electrode wire. Since such wire comes in relatively large, heavy spools, on larger operations it is necessary to drive the wire from the spool to the gun held by the operator so that the welding function is not confined to merely an area close to the welding machine. Prior apparatuses have not been provided with the proper drive means for the electrode wire such as to permit the welding gun to be properly operated a considerable distance from the spool of wire and machine.

Among the other disadvantages of prior arc welding equipment, is the fact that previous welding guns have not been conveniently cooled. Where water has been used, special conduits and flexible fittings are necessary, and even such systems are prone to leak after only a minimum amount of use. The result, of course, is an unusable system.

It has also been found that the drive means employed in prior welding guns for moving the electrode wire toward the welding tip have not included proper means for stopping and starting promptly the movement of the wire, frequently resulting in over-travel of the wire.

It is an object of the present invention to provide an arc welding gun having self contained motive power means for driving the electrode wire.

Another object of the present invention is to provide an arc welding gun as characterized above which utilizes air pressure for moving the electrode wire to the welding area.

Another object of the present invention is to provide an arc welding gun as characterized above which is formed with a cooling chamber to which air under pressure is provided for cooling the welding portion of the gun.

Another object of the present invention is to provide an arc welding gun as characterized above which utilizes air under pressure to drive the wire through the gun and for cooling the welding portion of the latter.

Another object of the present invention is to provide arc welding apparatus which permits the gun to be properly operated a considerable distance from the central source of electrode wire.

Another object of the present invention is to provide arc welding apparatus as characterized above wherein a single conduit is employed for conducting both air under pressure and electric current to the welding gun.

Another object of the present invention is to provide apparatus as characterized above wherein the air under pressure is successively conducted to an air motor for driving the electrode wire and to a cooling chamber for cooling the welding tip of the gun.

A further object of the present invention is to provide apparatus as characterized above wherein the cooling chamber is sufficiently large to permit the cooling air to expand therein to thereby increase its cooling effect.

A further object of the present invention is to provide a conduit which comprises a flexible tubular member formed of electrically conductive material, the hollow interior thereof being used for conducting air under pressure while the electrically conductive side wall is used to carry electrical current.

Another object of the present invention is to provide an arc welding gun and apparatus for utilizing the same, each of which is simple and inexpensive to manufacture and rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIGURE 4 is a top plan view of the arc welding gun of FIGURE 3 shown partly in section; said view being taken substantially along line 4—4 of FIGURE 2;

FIGURE 5 is a fragmentary sectional view taken substantially along the electrode wire in the gun;

FIGURE 6 is a transverse sectional view taken substantially along line 6—6 of FIGURE 2;

FIGURE 7 is a fragmentary elevational view of the rear of the gun taken substantially along line 7—7 of FIGURE 2;

FIGURE 8 is a fragmentary longitudinal sectional view of the dual cable useable in the arc welding apparatus of FIGURE 1; and FIGURE 9 is a fragmentary side elevational view of a second embodiment of an arc welding gun according to the present invention.

Like reference characters indicate corresponding parts throughout the several views of the drawings.

Figure 1:
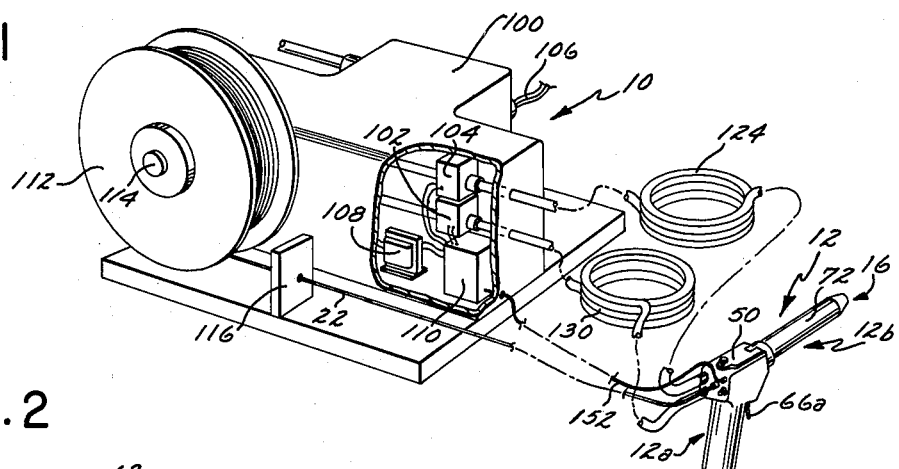
FIGURE 1 is a perspective view of arc welding apparatus according to the present invention.

Referring to FIGURE 1 of the drawings, there is shown therein arc welding apparatus which comprises a welding machine 10 to which is attached by certain cables and conduits, to be hereinafter described, an arc welding gun 12.

Figure 2:
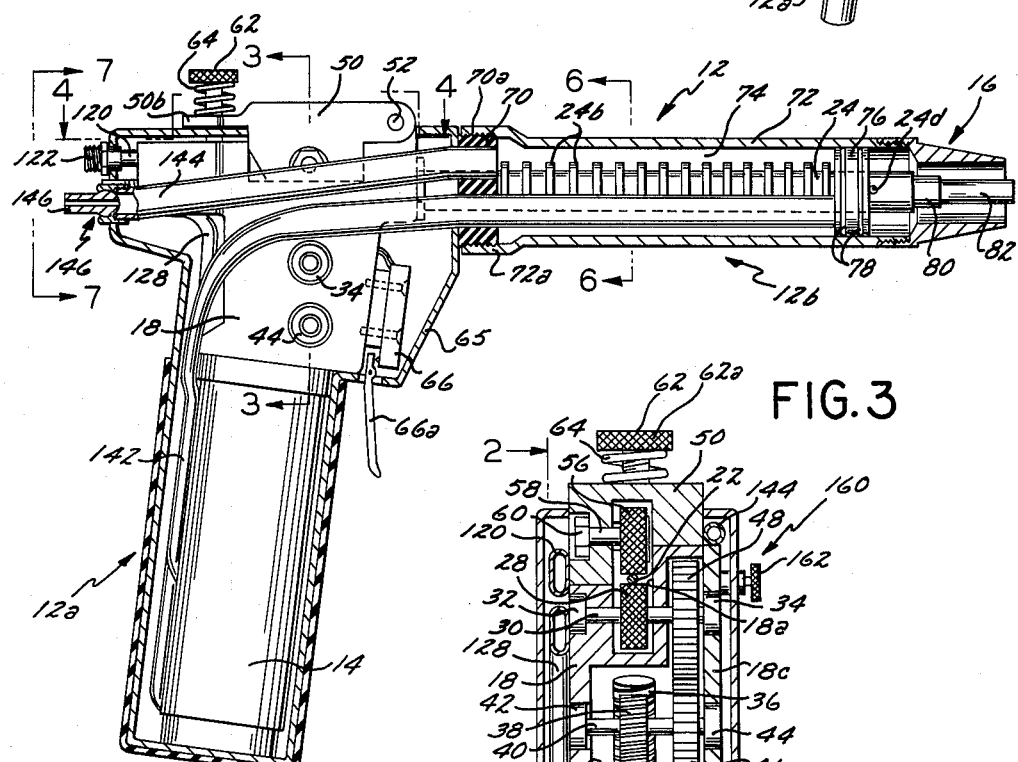
FIGURE 2 is a longitudinal sectional view through an arc welding gun useable in such apparatus.

As shown more clearly in FIGURE 2, gun 12 is generally L-shaped, on the order of a revolver or hand gun. It comprises a handle portion 12a and a barrel portion 12b. Within the handle portion 12a is motive power means 14 which, as will hereinafter be explained in detail, is operable to drive an electrode wire through the gun to the welding portion or tip 16.

Immediately above the motive power means 14 is a housing or body 18 to which is attached many of the components of the gun, including the transmission or drive means for the electrode wire. Such housing 18 may take substantially any desired form and may be constructed out of any appropriate material which is capable of conducting electrical current.

Figure 3:
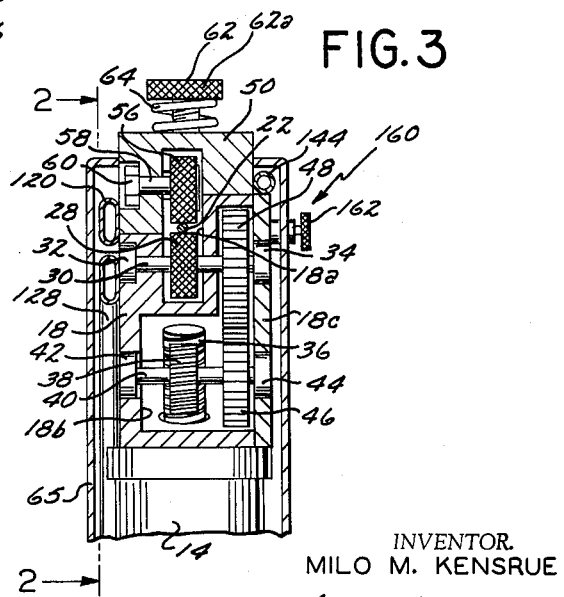
FIGURE 3 is a fragmentary sectional view taken substantially along line 3—3 of FIGURE 2 of the drawings.

As shown most clearly in FIGURES 3 and 5, housing 18 is formed with two cavities 18a and 18b. Cavity 18b is open to the side of housing 18 and is provided with a removable end wall 18c. Cavity 18b is generally L-shaped in cross section as shown in FIGURE 3.

Cavity 18a, on the other hand, is generally U-shaped and is accessible from the top of the housing 18 or gun 12 as seen in FIGURES 3 and 5.

The rearward portion 18d of housing 18 is formed with a threaded opening 18e wherein an elongated fitting or guide member 20 is threadedly positioned. Fitting 20 is formed with a through central opening 20a for loosely accommodating an electrode wire as shown at 22. Fitting 20 is, as will hereinafter become readily apparent, subject to considerable abrasive wear and hence is made of relatively hard material such as steel.

The forward portion 18f of housing 18 is also provided with a threaded opening 18g coaxially aligned with opening 18e for receiving one end of a tubular member 24 which also effectively guides the electrode wire 22 from the rear of the gun to the welding tip 16. The end of tubular member 24, of course, is formed with external fastening threads for engagement with the fastening threads 18g, and a lock nut 26 is also provided for insuring firm engagement of tubular member 24 and housing 18.

As shown most clearly in FIGURE 3 of the drawings, a drive wheel 28 is rotatably positioned within the cavity 18a of housing 18, said drive wheel being firmly attached to a pivot pin or shaft 30 suitably journaled within housing 18 and removable side wall 18c by bearing members 32 and 34 respectively. Said drive wheel 28 is positioned immediately beneath the electrode wire 22 as the latter is extended between the fitting 20 and the tubular member 24.

The motive power means 14 is operated by air under pressure and may take the form of an air motor, as presently available. Such motor 14 is generally cylindrical in shape and is provided with suitable impellers which are acted upon by the air pressure to rotate a worm 36 as shown in FIGURE 3. Thus, when air pressure is applied to motor 14 through means to be hereinafter described, the worm 36 is rotated in the appropriate direction. The absence of such air under pressure causes the worm 36 to remain stationary.

For cooperation with worm 36 there is provided within cavity 18b a worm gear 38 which is attached to a shaft 40 journaled in housing 18 and side wall 18c by bearing members 42 and 44 respectively. Also mounted on shaft 40 is a gear member 46 which cooperates with another gear member 48 secured to shaft 30. Such gear members 46 and 48 cooperate with worm 36 and worm gear 38 to effect the desired speed reduction in rotating drive wheel 28.

As seen in FIGURES 2, 3, 4 and 5 a cover 50 is provided for housing 18. Such cover is pivotally connected to housing 18 by a pivot pin 52 which extends through a pair of spaced extensions 50a on either side of an intermediate portion 18h of housing 18.

Cover member 50 is generally cup shaped affording a cavity 54 therewithin. An idler wheel 56 is rotatably mounted on a shaft 58 within the cavity 54. Said shaft 58 is secured to cover 50 by fastening means 60.

Idler wheel 56 is disposed immediately above the electrode wire 22 for controlling movement of the latter through the gun as will hereinafter appear.

The rearward portion 50b of member 50 is reduced in size and is formed with a through opening for receiving an adjustment screw 62. Screw 62 is formed with external fastening threads for engagement with complementally formed threads in an opening 18j in housing 18. A compression spring 64 is interposed between the upper surface of the rearward portion 50b of cover 50 and the under surface of the adjusting knob 62a of adjustment screw 62. Such knob 62a may be provided with a knurled peripheral surface to facilitate manual adjustment operation as will hereinafter be explained.

Encasing the entire handle portion 12a of gun 12, including the motive power means 14 and housing 18, is a shroud or casing 65 as shown most clearly in FIGURES 2, 3 and 4. Such shroud protects the internal components and mechanisms from undue abuse and contaminants and insulates the operator from the welding potential.

Mounted on housing 18 within shroud 65, is a control device 66 comprising an operating lever 66a. Such control device may take the form of an electric switch for controlling the arc welding apparatus as will hereinafter be described.

Firmly secured to tubular member 24 is a cylindrical insulating block 70 formed with external fastening threads 70a. A tubular barrel member 72 is provided with a flared end portion 72a which is formed with internal fastening threads for cooperation with the threads on insulation block 70. Such tubular barrel member, as will hereinafter become more apparent, is coaxially arranged in spaced relation to the tubular member 24 to provide therewith an annular cooling chamber 74.

Firmly secured to the forward end of tubular member 24 is a partition wall 76. Partition wall 76 is generally cylindrical in shape and is formed with a pair of spaced annular grooves for accommodating O-rings 78. Such O-rings, as will hereinafter become more apparent, provide an hermetic seal between the partition wall 76 and the tubular barrel member 72.

As will hereinafter become more apparent, the insulating block 70 and the rubber or plastic O-rings 78 cooperate to insulate barrel member 72 from the electrical charge of the wire 22 which also provides tubular member 24 with a like charge or potential.

As shown most clearly in FIGURES 2 and 5 of the drawings, tubular member 24 may be provided with suitable cooling fins 24b for increasing the cooling function as will hereinafter be explained.

Tubular member 24 is provided at its forward end portion with a pair of cylindrical members 80 and 82 which are welded in coaxial relation to provide a generally reducing diameter for the passage of the electrode wire 22. This arrangement permits the operator of the gun to better control the position of the end of the electrode wire on the work piece. Threadedly mounted on the end of sleeve 72 is a replaceable welding tip 84 which cooperates with sleeve 72 to provide a discharge chamber 86 for inert gas to be applied to the welding area.

Referring again to FIGURE 1 of the drawings, arc welding apparatus usually comprises a housing or control box 100 wherein is positioned suitable control instrumentalities. The present welding apparatus comprises, within housing 100, suitable means (not shown) for providing regulated air pressure. Such means includes the usual air filter and pressure regulator to be connected to a source of air pressure (not shown). The outlet of such control means is attached to a solenoid valve 102 which is operable to control the flow of air to the aforedescribed gun 12 as will hereinafter be explained in detail.

Also within housing 100 is suitable control means such as a filter and pressure regulator (neither are shown) for connection to a source of inert gas such as argon for use in making welds in certain types of metals. The output of such control instrumentalities is associated with a solenoid valve 104 for controlling the flow of such gas to the welding tip of gun 12 as will hereinafter appear.

For providing the proper direct current electrical potential for electrode wire 22, there is provided suitable electrical leads 106 which are connected to an appropriate source of electrical power (not shown).

To provide the necessary control functions for the welding apparatus, there is provided within housing 100 a transformer 108 which reduces the line voltage to approximately 24 volts. An electromagnetic relay 110 is operatively connected in circuit with the secondary winding of trasformer 108 and is rendered responsive to closure of microswitch 66, as will hereinafter be explained, to energize the solenoid valves 102 and 104. To complete such arrangement, there is provided suitable lead wires extending from relay 110 to each of the solenoid valves 102 and 104.

Also comprising a part of the arc welding machine 10 is a relatively large spool 112 of electrode wire 22. For most industrial applications a considerable quantity of wire is required and hence a relatively large spool 112 is employed. Since it is too large to be transported conveniently with the gun, the spool 112 is rotatably mounted on the housing 100 of welding machine 10. A mounting rod or pin 114 is provided for that purpose. A guide member 116 is preferably employed for guiding the electrode wire as it is pulled from the spool 112.

Referring to FIGURE 8 of the drawings, it is seen that the rearward portion of gun 12 is provided with five openings and fittings. One such opening is formed by tubing 120, one end of which carries an extremely threaded fitting 122 firmly mounted in shroud 65. The other end of tubing 120 is soldered or welded to member 24 about an opening 24c formed in the side wall thereof. That is, the forward end of tubing 120 is hermetically sealed to tubular member 24 so as to be in communication therewith.

As shown in FIGURE 1, a relatively long flexible cable or conduit 124 is interposed between the solenoid valve 104 and the fitting 122. Such conduit is provided with appropriate connectors at its opposite ends whereby the conduit is easily and quickly connected and disconnected as desired. Such conduit, of course, as will hereinafter appear, must be flexible so as to permit the operator maximum freedom in handling the welding gun 12, and must be sufficiently long to permit the operator freedom in his movements with respect to the welding apparatus 10. As noted above, solenoid valve 104 is operable to control the flow of the inert gas to the gun 12.

Another opening is afforded in the rear of gun 12 by a fitting 126 which is attached to one end of a fluid conduit 128. Such fitting 126 is also firmly mounted in the rear of shroud 65. The conduit 128 is generally L-shaped and extends along the rear of handle portion 12a of gun 12 to the inlet of the air-operated motive power means 14.

A dual conductor 130, in the form of both a fluid conduit and an electrical conductor, is provided between fitting 126 and solenoid valve 102 as shown most clearly in FIGURE 1. Such conductor 130, as shown in FIGURE 8, comprises a tubular member 132 formed of electrically conductive material such as copper, aluminum or the like. Such tubular member may be formed by an extrusion process whereby the side wall is continuous and uninterrupted throughout its entire length. In the alternative, such tubular member may be formed of braided wire, but in any event the side wall of such tubular member must be hermetically sealed to prevent the flow of air under pressure therethrough. That is, in addition to the side wall of tubular member 132 conducting the electrical current, the hollow interior of tubular member 132 is utilized to conduct the air for operation of the air driven motor.

A sleeve of insulating material 134 is provided about the tubular conductor 132.

Each end of dual conductor 130 is formed with a suitable connector for engagement respectively with fitting 126 and with solenoid valve 102. Each connector, as shown in FIGURE 8, comprises a body 136 having oppositely disposed tubular portions 138 and 140. Tubular portion 138 telescopically fits over the end of the insulation on conductor 132 and is fastened thereto in any suitable manner as by crimping. The tubular portion 140 is provided with internal fastening threads for engagement with the external threads on fitting 126.

Suitable electrical leads (not shown) connect the input leads 106 within housing 100 to the conductor 132 of the dual conductor 130. In this manner, the direct current electrical potential for providing the arc between the end of electrode wire 22 and the work piece is conducted to the dual conductor 130. Such potential is then conducted to the fitting 126 for application to the electrode wire 22. Thus the dual conductor 130 operates to provide both the air pressure and the welding current to the gun 12.

The opening 20a as shown in FIGURE 7 is the through opening of fitting 20, through which the electrode wire 22 passes as above explained and as shown more clearly in FIGURE 5.

The air discharged from the air motor 14 is conducted through a conduit 142 which extends from the handle portion 12a of the gun to the forward end of the barrel portion 12b. Such conduit 142 is generally L-shaped and opens into the aforedescribed annular chamber 74.

Discharge is afforded for the chamber 74 through a conduit 144 one end of which is mounted within insulating block 70 for communication with chamber 74. The other end of conduit 144 is exposed rearwardly of the gun and is provided with a swivel type nozzle 146 for directing the discharge air in the desired direction. As such, the air from the air motor 14 is caused to successively pass through conduit 142, chamber 74 and conduit 144 to the atmosphere.

The opening 150 at the rear of gun 12 accommodates electrical leads 152 which interconnect the electromagnetic relay 110 and the microswitch 66. Such opening 150 is provided by a grommet fitting 154 for protecting the lead wires 152. The secondary winding of transformer 108, electromagnetic relay 110 and the microswitch 66 are connected in series circuit relation so that closure of the contacts of switch 66 by actuation of lever 66a causes the secondary winding of transformer 108 to energize the electromagnetic relay 110. When this happens, of course, the solenoid valves 102 and 104 are energized to open condition so as to permit the inert gas and air to be provided to gun 12. At the same time, the direct current electrical potential for establishing the welding arc is applied, in response to actuation of lever 66a to the electrode wire 22 through the aforedescribed dual conductor 130.

With the work piece (not shown) connected in circuit with the electrode wire 22 but at a different electrical potential, closure of switch 66 affords the direct current potential to wire 22 to cause an arc to be developed between the end of the wire and the work piece when the former is held in proper relation to the latter. Simultaneous therewith, air pressure is applied to motor 14 to cause the worm 36 to rotate and thereby to cause drive wheel 28 to rotate through gears 38, 46 and 48. Such rotation of drive wheel 28 causes the electrode wire 22 to be advanced through the barrel of the gun 12.

The driving force between drive wheel 28 and electrode wire 22 can be controlled by the setting of adjustment means 62. By varying the position of the adjustment screw, the amount of bias from spring 64 as applied to the idler wheel 56 in its engagement with electrode wire 22 can be varied. The knurling on drive wheel 28 and idler wheel 56, of course, causes such wheels to firmly engage or grip the electrode wire 22.

In order to vary the rate of movement of the electrode wire through the gun, there is provided in conduit 128 a needle valve 160 having an adjustment member 162. Decreasing the flow of air to motor 14, causes the speed of rotation thereof to be reduced accordingly. In like manner, of course, the rate of movement of the electrode wire through the gun is also decreased.

Conversely, increasing the flow of air to the motor, increases the rate of movement of the electrode wire through the gun.

Simultaneous with the application of welding current and air pressure to the gun 12, is application of the inert gas to the welding tip 16. Such gas is also under control of switch 66 which effects energization of solenoid valve 104 in response to energization of electromagnetic relay 110. The inert gas flows through the conduit 124, tubing 120 and tubular member 24. A pair of oppositely disposed transverse openings 24d are provided in the end of tubular member 24 to permit the inert gas to be forced from the tubular member to the chamber 86. From here the gas is forced through the welding tip 16 to the area being welded.

In order to satisfactorily weld certain types of metals, the welding operation must be performed in an inert atmosphere. Such atmosphere is provided by the gas which follows the above described path. The inert gas replaces the ambient air at the point of welding and hence at the time the welding operation is taking place it is performed within an inert amtosphere.

After the air leaves the motor 14 in which it has been initially cooled by expansion, it is forced through the conduit 142 to the annular chamber 74 about tubular member 24. Here the air is permitted to further expand and thereby further decreases its temperature and affords greater surface for engagement with the various components of the barrel portion of the gun. As above mentioned, the arc between the electrode and the work piece develops an extremely high temperature, so much so in fact that the entire barrel portion of gun 12 becomes extremely hot. The air circulating within cooling chamber 74 effectively cools the sleeve member 72 and the tubular member 24. The annular fins 24b which are attached to or formed integrally with tubular member 24 increase the cooling surface for the tubular member 24.

Thereafter, the air from within chamber 74 is forced through discharge tubing 144 to the atmosphere through nozzle 146.

When it is desired to stop the welding operation, it is merely necessary to release lever 66a so as to permit the normal biasing means of the microswitch 66 to return the latter to open circuit condition. When this occurs, the relay 110 is de-energized thereby closing valves 102 and 104, and interrupting the welding current to the gun.

FIGURE 9 of the drawings shows an embodiment of the present invention wherein the electrode wire is carried on the gun iteself rather than being stored on a spool adjacent the welding apparatus as shown in FIGURE 1.

This embodiment comprises a pair of brackets 170 on either side of the housing 18 and shroud 65 of the gun 12. Such brackets are attached thereto as by bolts 172.

A spool 174 of electrode wire is then rotatably positioned between such brackets on a pin 176 which extends between the latter.

This arrangement, of necessity, is limited to a relatively modest supply of electrode wire. That is, it is not practical to have a heavy cumbersome quantity of wire attached to the gun 12 itself. However, such portability does permit the operator to perform welding operations at somewhat greater distances from the welding machine 10.

It should be particularly noted that the present invention provides drive means for the electrode wire, and cooling means for the barrel of the gun which are uniquely interrelated. That is, since the air is used to both drive the wire and cool the gun, any increase in temperature which results from a faster welding rate necessarily means that increased cooling will be afforded the gun. More specifically, in order to effect a faster welding rate, it is necessary to operate air motor 14 at a faster speed. To accomplish this, however, a larger quantity of air per unit time is required for the motor thus providing more cooling for the gun itself.

It is further seen that the present invention utilizes the same medium, namely air pressure, in a series arrangement to effect both driving of the wire and cooling of the gun. As each, interruption of one of the functions necessarily entails interruption of the other.

It is thus seen that the present invention provides various unique structures, including the welding gun, welding apparatus and dual conductor for providing a more efficient and more effective welding operation. This results in the operator being permitted to cover a larger area away from the central location of the welding apparatus or machine.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. An arc welding gun comprising in combination, a gun housing formed with a through opening through which an electrode wire is moved toward a welding portion of said housing, drive means for said wire including an air-driven motive power means having an air inlet and air outlet, a source of air under pressure connected to said air inlet, means connecting the air outlet of said motive power means to the welding portion of said housing to conduct cooled outlet air from the power means to effect cooling thereat, and conduit means for conducting said air to the atmosphere from the welding portion of said gun housing.

2. An arc welding gun comprising in combination, a gun housing formed with a handle and a barrel, a tubular member in said housing extending through said barrel to a welding portion thereof and through which an electrode wire is moved to a welding position, said barrel being spaced from and about said tubular member at said welding portion to provide a chamber thereat, drive means for said electrode wire including an air motor in the handle of said housing, said motor having an air inlet for connection to a source of pressurized air and an air outlet, conduit means connecting the air outlet of said motor to said chamber at the welding portion of said housing, and means for exhausting the air from said chamber, whereby motor outlet air cooled by expansion is utilized to cool the welding portion of said housing.

3. An arc welding gun comprising in combination, a gun housing having a hollow handle portion attached to a hollow barrel portion, a tubular member extending the length of said barrel portion and through which an electrode wire is to be moved, said barrel portion being spaced from said tubular member to form an annular chamber about the latter, an air motor within the hollow handle portion of said housing having an air inlet connectible to a source of air pressure and an air outlet, a flow control valve in said inlet to vary the flow of air to said motor to thereby vary the speed thereof, drive means for the electrode wire comprising a drive wheel formed with wire engaging means, speed reduction means interposed between said air motor and said drive wheel whereby the latter is driven by the former at a predetermined rate, conduit means connecting the air outlet of said motor to said annular chamber to permit the cooled outlet air from said motor to be further cooled by expansion into said chamber for cooling said barrel portion of said housing and said tubular member therewithin, baffle means within said chamber to increase circulation of the cooled air therewithin, means for exhausting the air from said chamber, and manual control means on the handle portion of said housing connectible to sources of air pressure and electric power to energize said electrode wire and apply air pressure to said motor.

4. Arc welding apparatus comprising in combination, a welding gun comprising a housing formed with a through opening through which electrode wire is moved, an air motor in said housing for moving said wire through said housing, a source of air pressure for said motor, a source of electric power for said electrode wire, and an air-electric conduit associated with both of said sources and with said motor and electrode wire, said conduit comprising a tubular electrical conductor for said electrode wire through which air under pressure is conducted to said air motor, said air being in direct cooling contact with the electrical conductor.

5. Arc welding apparatus, comprising in combination, a welding gun comprising a housing including an elongate barrel, an inwardly spaced tubular member extending through said barrel to a welding portion of said housing and through which an electrode wire is fed to a welding position at said welding portion, said tubular member and said barrel coacting to form a cooling chamber, drive means for feeding said electrode wire including an air actuated motor having inlet and outlet connections, a source of pressurized air for said motor, an electrical source for said electrode wire, an air-electric conduit having an inlet connected with both of said sources and an outlet connected with said motor inlet and said electrode wire, said conduit having a tubular electrical conductor through which the air is movable in direct cooling contact therewith, and means for conducting air cooled by expansion in said motor from its outlet connection to atmosphere through a path including said chamber.

6. Arc welding apparatus comprising in combination, a welding gun comprising a housing including an elongate barrel, an inwardly spaced tubular member extending through said barrel to a welding portion of said housing and through which an electrode wire is fed to a welding position at said welding portion, projecting fins carried by said tubular member projecting into a chamber formed by it and said barrel, drive means for feeding said electrode wire including an air actuated motor having inlet and outlet connections, a source of pressurized air for said motor, an electrical source for said electrode wire, an air-electric conduit having an inlet connected with both of said sources and an outlet connected with said motor inlet and said electrode wire, said conduit having a tubular electrical conductor through which the air is movable in direct cooling contact therewith, and means for conducting air cooled by expansion in said motor from its outlet connection to atmosphere through a path including said chamber.

7. Arc welding apparatus comprising in combination, a welding gun comprising a housing including an elongate barrel, an inwardly spaced tubular member extending through said barrel to a welding portion of said housing and through which an electrode wire is fed to a welding position at said welding portion, said tubular member and said barrel coacting to form a cooling chamber, drive means for feeding said electrode wire including an air associated motor having inlet and outlet connections; a source of pressurized air for said motor, an electrical source for said electrode wire, an air-electric conduit having an inlet connected with both of said sources and an outlet connected with said motor inlet and said electrode wire, said conduit having a tubular electrical conductor through which the air is movable in direct cooling contact therewith, means for conducting to said chamber air from said conduit cooled by expansion in said motor including means for further cooling by expansion the air entering said chamber, and means for exhausting air from said chamber to atmosphere.

References Cited by the Examiner
UNITED STATES PATENTS

| | | | |
|---|---|---|---|
| 1,731,502 | 10/1929 | Paterson | 219—130 |
| 2,193,977 | 3/1940 | Martin | 219—89 |
| 2,376,692 | 5/1945 | Heim | 219—88 |
| 2,719,245 | 9/1955 | Anderson | 314—69 |
| 2,900,488 | 8/1959 | Bassot | 219—130 |
| 3,093,728 | 6/1963 | Adamson | 219—130 |
| 3,119,948 | 1/1964 | Baird | 314—101 |

ANTHONY BARTIS, *Acting Primary Examiner.*

RICHARD M. WOOD, *Examiner.*